United States Patent [19]

White et al.

[11] 4,264,094

[45] Apr. 28, 1981

[54] ENERGY ABSORBING BUMPER MOUNT FOR VEHICLES

[75] Inventors: Charles R. White, Troy, Mich.; Wayne V. Fannin, Xenia, Ohio

[73] Assignee: General Motors Corporation, Detroit, Mich.

[21] Appl. No.: 68,630

[22] Filed: Aug. 22, 1979

[51] Int. Cl.³ .............................................. B60R 19/08
[52] U.S. Cl. ...................................... 293/135; 267/139
[58] Field of Search ............... 293/120, 107, 102, 108, 293/110, 124, 131, 135, 137, 136, 155; 267/139

[56] References Cited

U.S. PATENT DOCUMENTS

| | | | |
|---|---|---|---|
| 1,290,187 | 1/1919 | Helman et al. | 293/135 |
| 1,935,447 | 11/1933 | Hoffman | 293/107 |
| 1,985,113 | 12/1934 | Smith | 293/107 |
| 2,058,283 | 10/1936 | Wolff | 293/131 |
| 3,933,387 | 1/1976 | Salloum | 293/120 |
| 4,046,411 | 9/1977 | Richard, Jr. | 260/650 |
| 4,072,334 | 2/1978 | Seegmiller et al. | 293/110 |
| 4,076,226 | 2/1978 | Anolick et al. | 267/139 |
| 4,105,236 | 8/1978 | Harr | 293/110 |
| 4,178,028 | 12/1979 | Lura | 293/135 |

Primary Examiner—John J. Love
Assistant Examiner—Norman L. Stack
Attorney, Agent, or Firm—Charles R. White

[57] ABSTRACT

This energy absorbing bumper mount comprises a spring bracket assembly which includes a pair of diverging spring arms that carry pins on the outer end thereof. A preloaded yieldable energy absorbing band of oriented plastic material is stretched across the arms by attachment to the pins. On impact of a bumper attached to the spring arms, the pins are laterally displaced from one another as the spring arms are deflected. Energy is absorbed by the stretching of the band and by deflection of the spring arms. Rebound is controlled with the slow recovery rate of the band acting as a buckling column to retard recovery of the spring arms to their normal undeflected position.

3 Claims, 4 Drawing Figures

U.S. Patent  Apr. 28, 1981  4,264,094
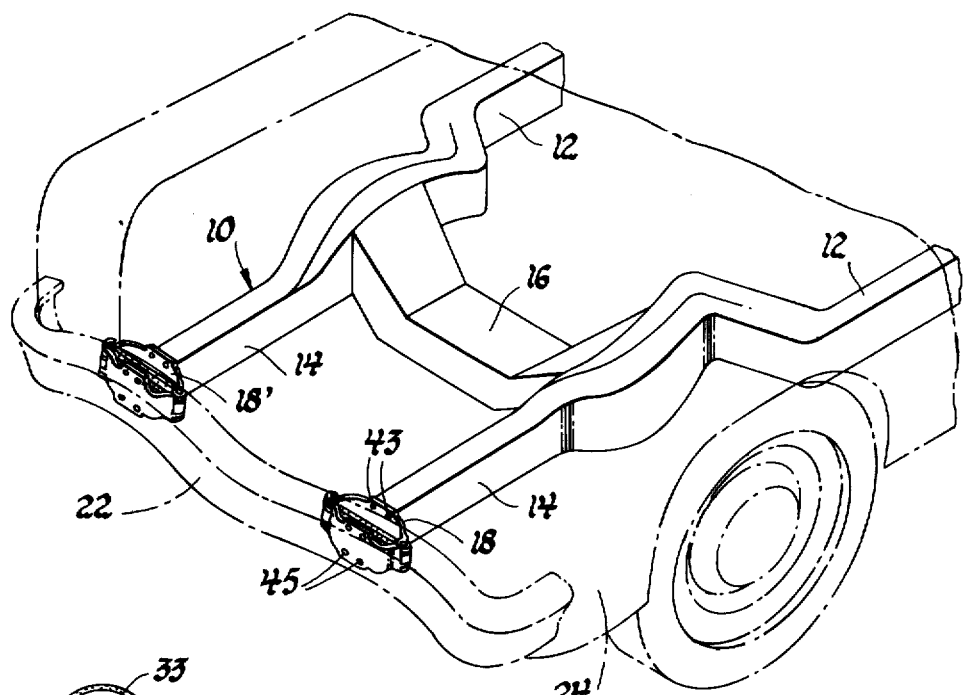
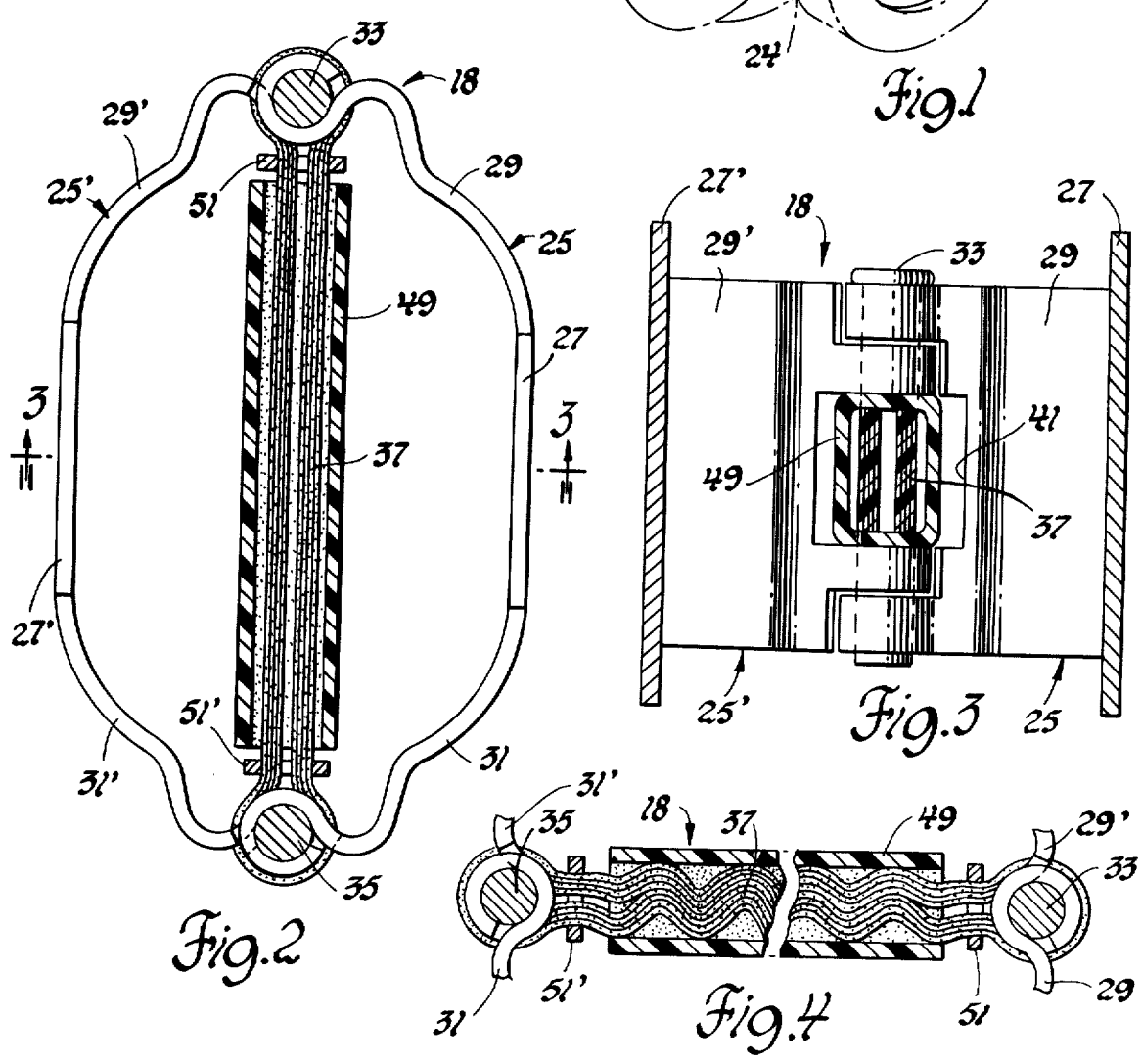
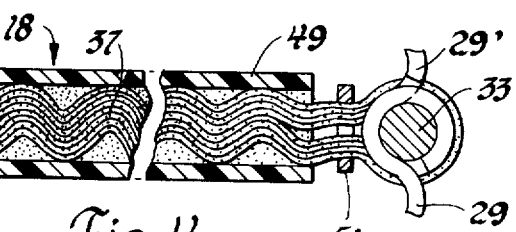

ENERGY ABSORBING BUMPER MOUNT FOR VEHICLES

This invention relates to a new and improved energy absorbing bumper mount for vehicles and more particularly to a mounting bracket yieldably coupling a bumper to a vehicle support which stretches a resilient energy absorber on relative movement of the components to absorb kinetic energy and which opposes and retards movement of the bumper assembly to its pre-impact position.

Prior to the present invention, a wide variety of energy absorbing units have been utilized to yieldably mount a rigid, transversely extending bumper to the frame or unibody construction of a vehicle for absorbing impact energy which displaces the bumper relative to its support. Some of these units comprise telescoping inner and outer members which are movable from an extended position to a telescoped and collapsed position on bumper impact of predetermined magnitudes. These energy absorber units often employ viscous fluids, spring devices, or stretchable bands of oriented plastic material for dissipating the energy of such impacts and some employ devices for returning the bumper assembly to a pre-impact position. While these prior energy absorbing devices have adequately performed to absorb impact energy, they are often costly, bulky, complex in construction and have added considerable weight to the vehicle. In other constructions requiring a long energy absorber stroke, the bumper has been positioned outwardly from the body work of the vehicle to such an extent that it does not aesthetically match the vehicle body work.

The present invention is drawn to a new and improved lightweight and economical energy absorbing unit for mounting a vehicle bumper close to the body work which utilizes a minimal number of parts and is comprised of a bracket having a pair of arms which diverge outwardly from a base connected to a support on a vehicle. A band of resilient energy absorbing material of oriented plastic material such as "Hytrel" is connected to opposed extremities of the arms by suitable fasteners. A second spring bracket operatively couples the ends of the spring arms of the first bracket to a movable bumper. On impact, the bumper is displaced inward relative to the vehicle body to simultaneously flex the spring arms and stretch the band which will absorb impact energy. After impact the spring arms return the bumper to its outer pre-impact location relative to the vehicle body. The band having a low recovery rate acts as a buckling column and opposes the rebound force of the spring arms and thus delays the return of the bumper to its outermost position to insure that no additional damage is done by the recovering bumper. After the bumper is repositioned, the band recovers to its original position so as to be ready for additional energy absorbing cycle operation.

The band or the belt forming the energy absorber of this invention is preferably of an oriented plastic material which can be readily tailored to suit the various energy absorbing requirements by increasing or decreasing the thickness of the band or in the case of a multiwrap band by varying the number of wraps of the plastic material forming the band. Such energy absorbers have a long service life and provide a new medium for effective, low cost, lightweight energy absorber.

A feature, object and advantage of this invention is to provide a new and improved energy absorbing unit operatively mounting relatively movable members of a vehicle comprising an elongated energy absorber of oriented plastic material which is supported and stretched by a pair of diverging and movable arms to absorb impact energy causing movement of the arms and in which the recovery of the arms to the original position is opposed by the buckling action of the resilient material which has a slower rate of recover than the arms.

Another feature, object and advantage of this invention is to provide a new and improved energy absorbing unit which is particularly adaptable for supporting vehicle bumper or the like that incorporates a minimal number of components, which is lightweight and highly effective in absorbing input energy on the stretching of a resilient energy absorbing band of oriented plastic material that is preloaded between spring arm members operatively connected between the bumper and a support on a vehicle in a manner such that the spring arms and the band are simultaneously deflected in response to an impact load moving the bumper relative to the vehicle body. Recovery is delayed by action of the band opposing the spring arms recovering to their pre-impact position.

Another feature, object and advantage of this invention is to provide a new and improved energy absorbing mount which connects a bumper to a support structure of a vehicle; the mount incorporating a pair of resilient spring arms that carry a laterally extending band of resilient oriented plastic material which is stretched in response to flexure of the arms on bumper impact so that the impact energy is absorbed and which actively opposes recovery of the bumper in moving to a pre-impact position to slow the rate of recovery.

These and other features, objects and advantages of this invention will be more apparent from the following detailed description and drawing in which:

FIG. 1 is a perspective view of a portion of an automotive vehicle chassis frame and a pair of energy absorber units mounting a bumper assembly to the frame;

FIG. 2 is a top view showing one of the energy absorber units of FIG. 1 in a normal position to hold the bumper assembly outward of the vehicle frame;

FIG. 3 is a sectional view taken along lines 3—3 of FIG. 2 and FIG. 4 is a top view of a portion of FIG. 2.

Referring now in detail to FIG. 1 of the drawing, there is shown a portion of a vehicle chassis frame 10 comprising a pair of laterally spaced side rails 12 having forwardly extending front portions 14 interconnected by a cross brace member 16. Secured by bolts or other suitable fasteners to the end of the front portions 14 of the frame are a pair of energy absorbing units 18 and 18' that yieldably supports a bumper assembly 22 outwardly of the body work 24 of the vehicle. Since both of the units 18 and 18' are the same in construction and operation, only one is described in detail.

As shown, the energy absorbing unit 18, in its preferred form, comprises a pair of spring brackets 25 and 25' connected to each other to form a generally elliptical spring unit yieldably coupling the ends of the vehicle frame to the bumper assembly 22. Each bracket has a flat attachment base 27 or 27' and a pair of spring arms 29, 31 or 29', 31' diverging therefrom. The extremities of each arm are barreled and mate as shown in FIGS. 2 and 3 to receive vertical hinge pins 33 and 35.

Stretched and preloaded between pins 33 and 35 is a suitable energy absorber 37 which is preferably made of an oriented plastic material such as "Hytrel". On impact of the bumper assembly causing deflection of the spring arms, the energy absorber is further stretched to absorb impact energy. Such an energy absorber has a good memory and a low recovery rate advantageously used in this invention for rebound control in the return of the bumper assembly to its original position through the recovery force exerted by the spring arms. The energy absorber is preferably formed by a ribbon of the above referenced plastic material which is multiplicately wrapped around the pins 33 and 35 to form a band that extends through suitable openings formed in the ends of the spring arms such as shown at 41 in FIG. 3. The energy absorber band may be the same as that of U.S. Pat. No. 4,046,411 issued to Raymond L. Richard hereby incorporated by reference.

The spring bracket 25 is fastened to the end of the side rail 12 by threaded fasteners 43 while companion bracket 25' is coupled to the bumper assembly 22 by threaded fasteners 45. With this spring bracket construction and the preloaded band, the bumper assembly is yieldably maintained outwardly of the body work to prevent damage thereto.

In addition to the spring brackets and energy absorbing multiwrap band 37, this invention incorporates an elongated tubular retainer 49 through which the main body of the band 37 extends. The tubular retainer may be formed from a suitale hardened plastic material which extends laterally within the confines of the brackets 25 and 25' from terminal positions adjacent pins 33 and 35. The band 37 is tied off by suitable fasteners 51, 51' at either end of the retainer 49 as shown in FIG. 2. The fasteners or constrictors 51, 51' are metal buckle-like members with a rectilinear interior to conform to the periphery of the band 37 and which are constricted to draw the sides of the band 37 together as shown in FIGS. 2 and 4 so that the body of the band is in alignment with the pins and will oppose and retard movement of pins 33 and 35 toward one another. This tubular retainer serves to protect the band in its environment when supporting the bumper assembly and further contributes to control of bumper rebound velocity as it returns to its outward position after being stroked in response to an impact.

On impact, by a load which is greater than a predetermined impact load, the bumper assembly and the vehicle body relatively move toward one another. On this movement, the spring arms of the brackets 25 and 25' will be flexed toward one another causing the general lateral movement of pins 33 and 35 away from one another. This pin action stretches the plastic band 37. The flexure of the spring arms plus the stretching of the band 37 will absorb the kinetic energy of the relatively moving bumper assembly and frame with components supported thereon. Since most impacts are low speed impacts and the energy absorbing deflection is lateral, the bumper assembly will not be cramped into the body work to cause damage thereto and the energy imparted will be stored in the deflected spring arms and the stretched plastic energy absorber.

After removal of the impact load, the spring arms will deflect back toward their original position of FIG. 2 to move the bumper assembly toward its outer position. The force of recovery stored in the spring arms will be opposed by the stretched plastic energy absorber since the oriented plastic material has a lower recovery rate than the spring arms. As the spring arms move closer together, the plastic energy absorber will act as a buckling column member to retard the movement of the spring arms to their outer position, thus slowing the rate of the bumper in moving to its outer position. In addition to the buckling action of the band 37 to retard the rate of recovery, the confinement and contact of the undulating portions of the band 37 in the tubular retainer 49 increases the resistance offered by the band. Thus, the recovery of the spring arms is further delayed by the inner action of the retainer and the buckling band. After the bumper is returned to its outer position, the energy absorbing band 37 will gradually return to preloaded configuration ready for additional work in the event of bumper assembly impact.

From the above it will be appreciated that this invention makes advantageous use of the energy absorbing band for control of impact and rebound energy. With the retarded rebound provided by this construction, there is reduced likelihood of any additional damage from rebound stroke.

While a preferred embodiment of the invention has been shown and described to illustrate the invention, other modifications will become apparent to those skilled in the art. Accordingly, the scope of this invention is set forth in the following claims.

The embodiments of the invention in which an exclusive property or privilege is claimed are defined as follows:

1. An energy absorbing unit yieldably coupling relatively movable first and second components of a vehicle to one another comprising bracket means operatively connecting said component to one another, said bracket means having a central base portion and a pair of resilient spring arms diverging outwardly from said base portion and in opposite directions from one another to laterally spaced terminal extremities, an elongated and stretchable energy absorber comprising a length of oriented plastic material, said energy absorber having attachment portions at opposite outer extremities thereof, first fastener means securing a first attachment portion of said energy absorber to the extremity of one of said arms, second fastener means securing a second attachment portion of said energy absorber to the extremity of the other of said arms, first connector means operatively connecting said base portion to said first vehicle component, second connector means connecting said bracket means to said second vehicle component so that an impact load directed on to one of said components causes the relative movement of said components from a first position to a second position to thereby resiliently deflect said arms and increase the spacing between said first and second fastener means and stretch said energy absorber, and constrictor means securing said attachment portion of said energy absorber to said first and second fastner means whereby said energy absorber forms a yieldable flexible column in direct alignment with said first and second fastener means oppose and retard the return of said component means from said second to said first position to thereby reduce the rate of recovery thereof.

2. An energy absorber unit yieldably mounting relatively movable first and second components of a vehicle to one another comprising bracket means operatively connecting said components to one another, said bracket means having a central base portion and a pair of resilient spring arms diverging outwardly from said base portion and in opposite directions from one another to laterally spaced terminal extremities, an elongated and stretchable energy absorber of oriented plastic material, having outer end portions at opposite outer extremities thereof, first fastener means securing a first outer end portion of said energy absorber to the extremity of one of said arms, second fastener means securing a second outer end portion of said energy absorber to the extremity of the other of said arms, first connector means operatively connecting said base portion of said bracket means to said first vehicle component and second connector means connecting said bracket means to said second vehicle component so that an impact load directed onto one of said components causes the relative movement of said components from a pre-impact position toward one another to resiliently deflect said arms and increase the spacing between said first and second fastener means to thereby stretch said energy absorber, and connector means securing said outer end portions of said energy absorber to said first and second fastner means whereby said energy absorber forms means to align the stretched body of said energy absorber with said first and second fastener means to permit said energy absorber to function as a buckling column to oppose the recovery force of said spring arms and thereby retard movement of said components to their pre-impact position.

3. An energy absorbing bumper mount for yieldably coupling a bumper assembly to support structure of a vehicle comprising bracket means having a central base portion and a pair of resilient arms diverging outwardly from said base portion and in opposite directions from one another to laterally spaced terminal extremities, an elongated energy absorber comprising a stretchable multiwrap band of oriented plastic material having outer end portions at opposite extremities thereof, first and second means securing said end portions to respective terminal extremities of said arms, a retainer disposed around a portion of said multiwrap band extending between said arms, connector means operatively connecting said base portion to said support structure, means operatively connecting the ends of said arms to said bumper assembly so that an impact load directed into said bumper assembly causes the general displacement of said ends of said arms from one another to thereby stretch said energy absorber, and said retainer being an elongated tubular retainer means disposed around the central portion of said band forms a buckling column with indulations which contact the interior of said retainer means to thereby retard movement of said bumper from its impacted position to its pre-impact position.

* * * * *